(12) United States Patent
Chen

(10) Patent No.: US 9,137,715 B2
(45) Date of Patent: Sep. 15, 2015

(54) SYSTEM AND METHOD FOR SUPPORTING BANDWIDTH REQUESTS IN A HANDOVER

(75) Inventor: Bin Chen, Schaumburg, IL (US)

(73) Assignee: Futurewei Technologies Inc., Plano, TX (US)

( * ) Notice: Subject to any disclaimer, the term of this patent is extended or adjusted under 35 U.S.C. 154(b) by 18 days.

(21) Appl. No.: 12/964,164

(22) Filed: Dec. 9, 2010

(65) Prior Publication Data
US 2011/0216736 A1 Sep. 8, 2011

Related U.S. Application Data

(60) Provisional application No. 61/311,160, filed on Mar. 5, 2010.

(51) Int. Cl.
*H04W 4/00* (2009.01)
*H04W 36/00* (2009.01)
*H04W 28/20* (2009.01)

(52) U.S. Cl.
CPC .......... *H04W 36/0072* (2013.01); *H04W 28/20* (2013.01)

(58) Field of Classification Search
CPC ............ H04W 72/1284; H04W 88/06; H04W 72/0413; H04W 36/0055
See application file for complete search history.

(56) References Cited

U.S. PATENT DOCUMENTS

| | | | | |
|---|---|---|---|---|
| 6,771,962 | B2 * | 8/2004 | Saifullah et al. | 455/436 |
| 7,006,472 | B1 * | 2/2006 | Immonen et al. | 370/332 |
| 7,529,193 | B2 | 5/2009 | Zimmerman et al. | |
| 8,175,599 | B2 * | 5/2012 | Oh | 455/436 |
| 2002/0181419 | A1 * | 12/2002 | Zhang et al. | 370/331 |
| 2005/0089064 | A1 | 4/2005 | Zimmerman et al. | |
| 2006/0250963 | A1 * | 11/2006 | Jin et al. | 370/236 |
| 2008/0161000 | A1 | 7/2008 | Li et al. | |
| 2008/0280619 | A1 | 11/2008 | Chun et al. | |
| 2009/0117891 | A1 * | 5/2009 | Chou | 455/423 |
| 2010/0003985 | A1 * | 1/2010 | Jang et al. | 455/436 |
| 2010/0027457 | A1 * | 2/2010 | Okuda | 370/315 |
| 2011/0002306 | A1 | 1/2011 | Liu | |
| 2012/0069813 | A1 * | 3/2012 | Cho et al. | 370/329 |

FOREIGN PATENT DOCUMENTS

| | | |
|---|---|---|
| CN | 1473415 A | 2/2004 |
| CN | 101138220 A | 3/2008 |
| CN | 101516121 A | 8/2009 |
| CN | 101516121 A | 8/2009 |

(Continued)

OTHER PUBLICATIONS

"Part 16: Air Interface for Fixed and Mobile Broadband Wireless Access Systems," IEEE P802.16m/D5, Apr. 2010, 12 pages.

(Continued)

*Primary Examiner* — Melanie Jagannathan
(74) *Attorney, Agent, or Firm* — Slater & Matsil, LLP

(57) ABSTRACT

A system and method for supporting bandwidth requests in a handover are provided. A method for mobile station operations includes transmitting a first message, receiving a second message responsive to the first message, and initiating a handover with the target controller and a serving controller. The first message includes an incremental bandwidth request, the second message includes an indicator indicating that a target controller has allocated resources at least equal to a total bandwidth required by the mobile station, and the total bandwidth required by the mobile station is provided by a serving controller or maintained by the target controller.

22 Claims, 6 Drawing Sheets

(56) References Cited

FOREIGN PATENT DOCUMENTS

| CN | 101534532 A | 9/2009 |
|---|---|---|
| CN | 101534532 A | 9/2009 |
| CN | 101617547 A | 12/2009 |
| KR | 20080064426 A | 7/2008 |
| KR | 20080064426 A | 7/2008 |
| KR | 20080086338 A | 9/2008 |
| KR | 20080086338 A | 9/2008 |

OTHER PUBLICATIONS

"International Search Report," International Application No. PCT/CN2011/071551, Applicant: Huawei Technolgies Co., Ltd. et al., mailing date: Jun. 16, 2011, 3 pages.

"Written Opinion of the International Searching Authority," International Application No. PCT/CN2011/071551, Applicant: Huawei Technolgies Co., Ltd. et al., mailing date: Jun. 16, 2011, 7 pages.

PCT International Search Report and Written Opinion for PCT/CN2011/071551, mailed Jun. 16, 2011, 10 pages.

Chinese Search Report received in Chinese Application No. 2011800126377 mailed Aug. 22, 2014, 2 pages.

First Chinese Office Action received in Chinese Application No. 201180012637.7 mailed Sep. 2, 2014, 5 pages.

Chinese Office Action received in Application No. 201180012637.7 mailed Apr. 8, 2015, 6 pages.

Chinese Search Report received in Application No. 2011800126377 mailed Mar. 30, 2015, 2 pages.

\* cited by examiner

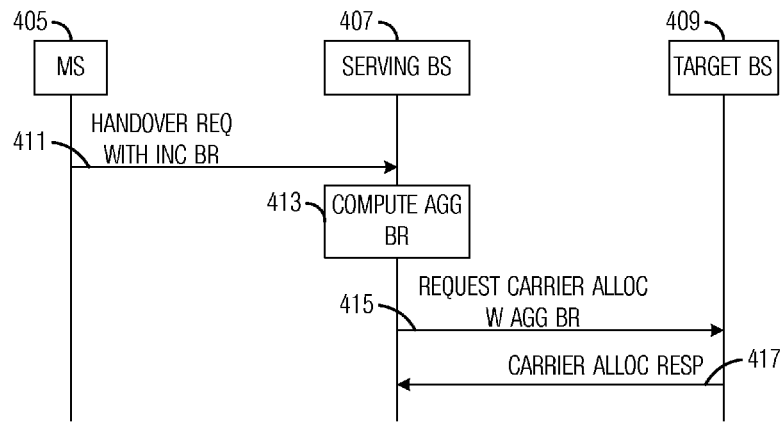
*Fig. 4a*
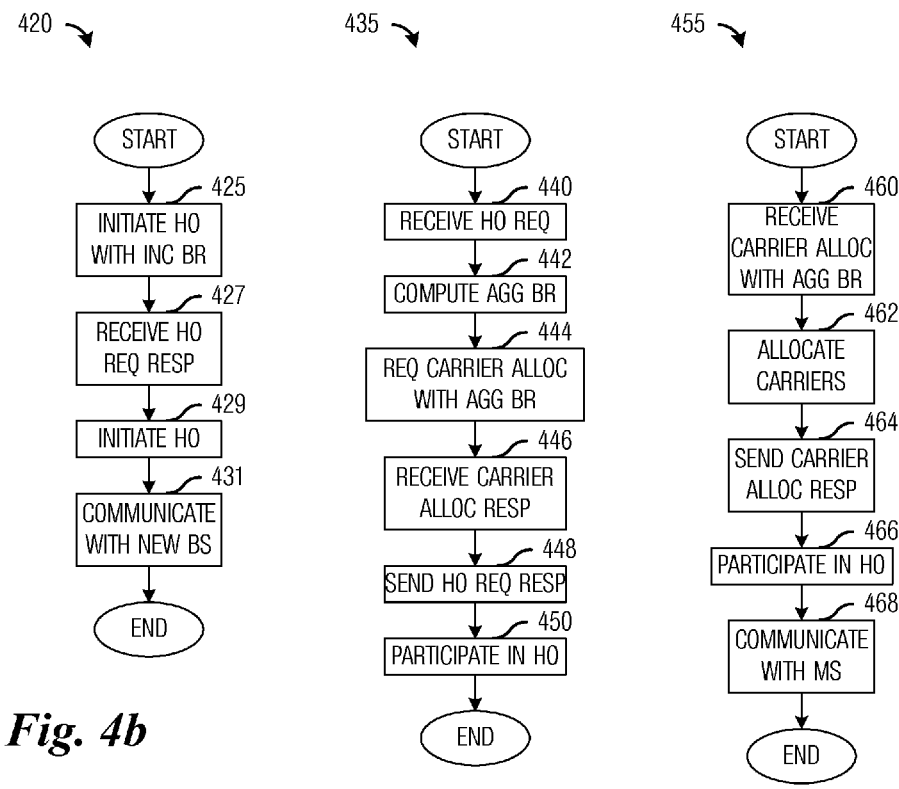
*Fig. 4b*  *Fig. 4c*  *Fig. 4d*

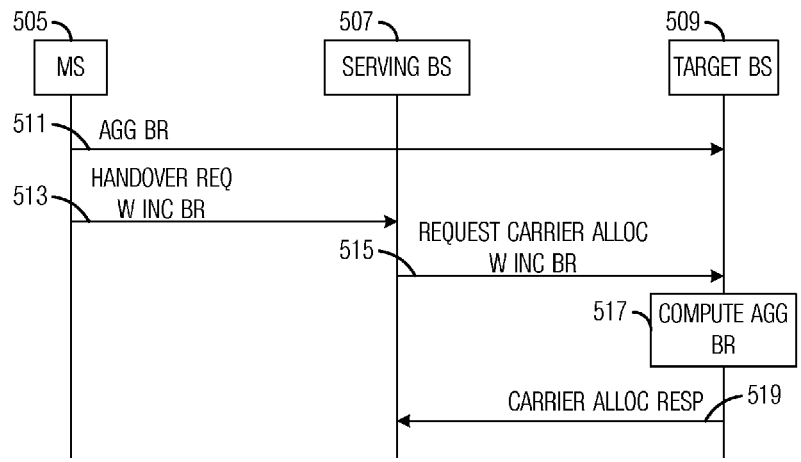
*Fig. 5a*
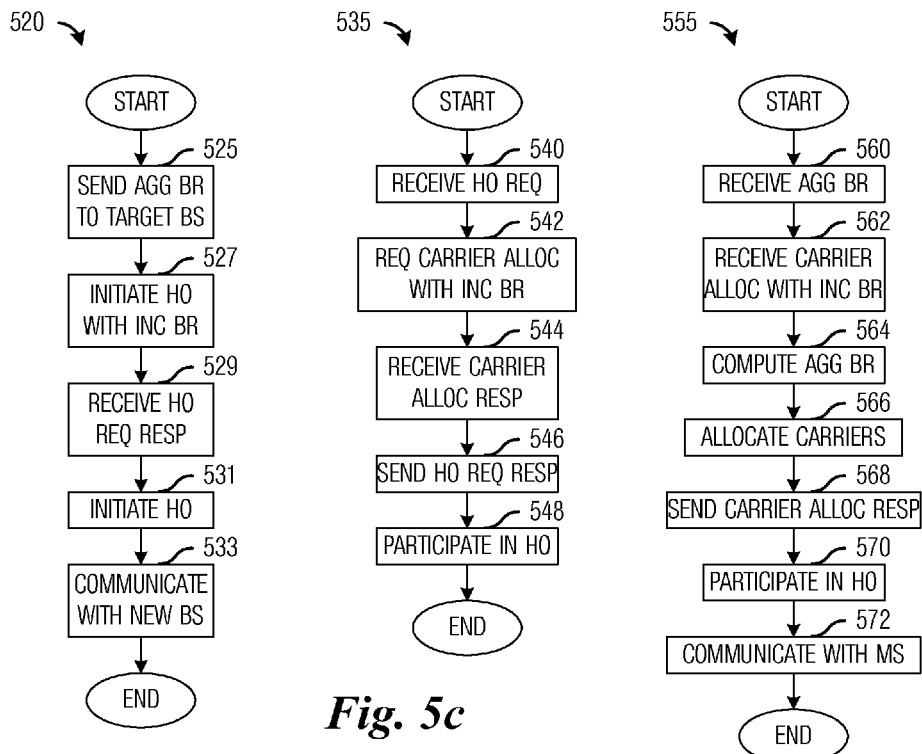
*Fig. 5b*  *Fig. 5c*  *Fig. 5d*

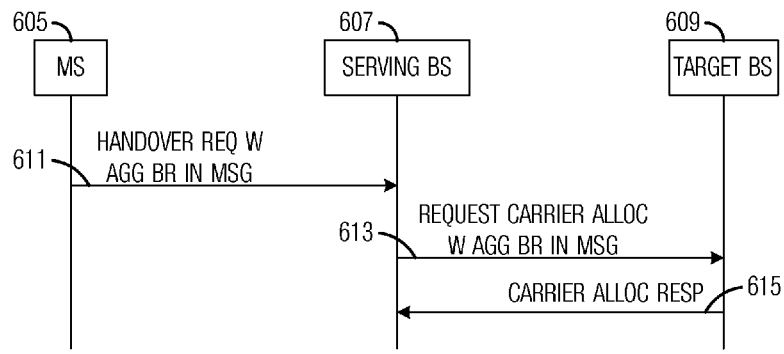
*Fig. 6a*
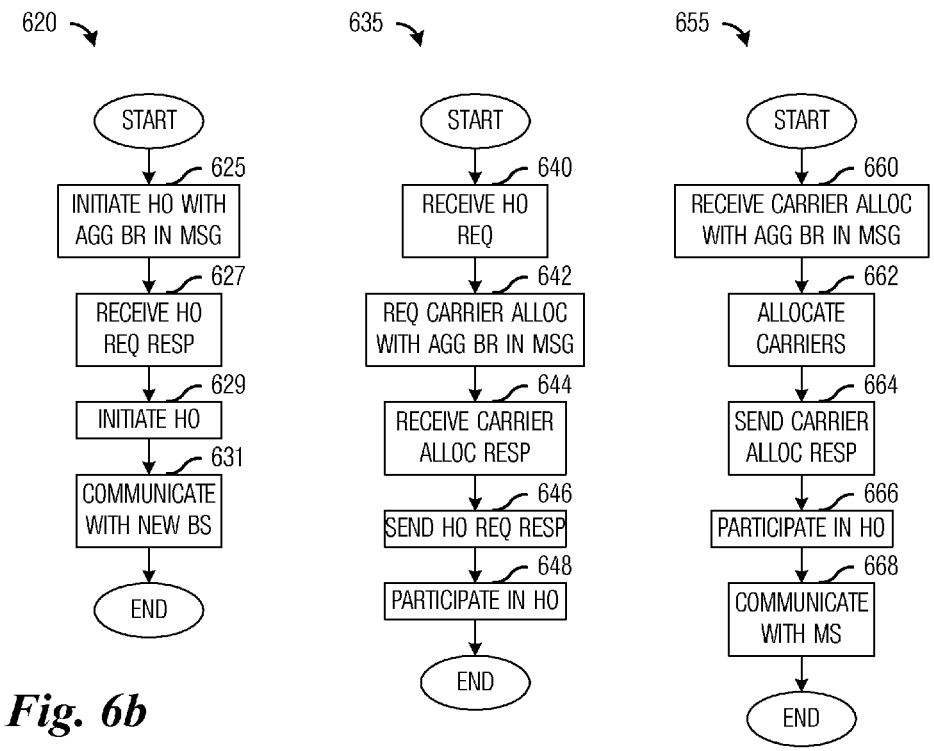
*Fig. 6b*
*Fig. 6c*
*Fig. 6d*

SYSTEM AND METHOD FOR SUPPORTING BANDWIDTH REQUESTS IN A HANDOVER

This application claims the benefit of U.S. Provisional Application No. 61/311,160, filed Mar. 5, 2010, entitled "A Method for Bandwidth Request," which application is hereby incorporated herein by reference.

TECHNICAL FIELD

The present invention relates generally to wireless communications, and more particularly to a system and method for supporting bandwidth requests in a handover.

BACKGROUND

In general, a handover occurs in a communications system when a mobile station or simply MS (also commonly referred to as a communications device, user equipment, subscriber, user, and so forth) moves out of a coverage area of a first base station or simply BS (also commonly referred to as a NodeB, enhanced NodeB, base terminal station, controller, and so on) and into a coverage area of a second BS, and control of the MS changes from the first base station to the second BS.

In order to maintain expected performance levels and/or meet quality of service (QoS) requirements, existing bandwidth requirements of the MS should be preserved when the MS changes from the first BS to the second BS. If existing bandwidth requirements are not preserved, the MS may experience decreased performance levels, failure to meet one or more QoS requirements, dropped connections, and so on.

SUMMARY OF THE INVENTION

These and other problems are generally solved or circumvented, and technical advantages are generally achieved, by preferred embodiments of the present invention which provide a system and method for supporting bandwidth requests in a handover.

In accordance with a preferred embodiment of the present invention, a method for mobile station operations is provided. The method includes transmitting a first message, receiving a second message responsive to the first message, and initiating a handover with the target controller and the serving controller. The first message includes an incremental bandwidth request, the second message includes an indicator indicating that a target controller has allocated resources at least equal to a total bandwidth required by the mobile station, and the total bandwidth required by the mobile station is provided by a serving controller or maintained by the target controller.

In accordance with another preferred embodiment of the present invention, a method for serving controller operations is provided. The method includes receiving a first message from a mobile station, the first message includes an incremental bandwidth request, transmitting a second message to a target controller, the second message includes a bandwidth request based on the incremental bandwidth request, and transmitting a third message to the mobile station, the third message includes a response to the first message. The method further includes participating in a handover with the target controller and the mobile station.

In accordance with another preferred embodiment of the present invention, a method for target controller operations is provided. The method includes receiving a first message, receiving a second message, allocating carriers based on the bandwidth request and the total bandwidth requirement for the mobile station, transmitting a third message, and participating in a handover. The first message includes a total bandwidth requirement for a mobile station, the second message includes a bandwidth request, and the third message includes an indication of the allocated carriers.

In accordance with another preferred embodiment of the present invention, a communications device is provided. The communications device includes a transmitter, a receiver coupled to the transmitter, and a handover unit coupled to the transmitter and to the receiver. The transmitter transmits a first message; the first message includes an incremental bandwidth request. The receiver receives a second message responsive to the first message; the second message includes an indicator indicating that a target controller has allocated resources at least equal to a total bandwidth required by a mobile station, and the handover unit initiates a handover with the target controller and a serving controller.

An advantage of an embodiment is that a target BS knows a bandwidth requirement of a MS prior to a handover is permitted to proceed so that the target BS may allocate resources to meet or exceed the bandwidth requirements of the MS. By meeting the bandwidth requirements of the MS prior to the completion of the handover, the performance of the MS is maintained.

A further advantage of an embodiment is that signaling of bandwidth requests from the MS using incremental bandwidth requests or aggregate bandwidth requests are maintained, thereby allowing for a reduction in overhead in bandwidth requests as well as overall signaling overhead.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4a is a drawing of a message exchange in a handover, wherein the total amount of bandwidth needed by a MS is indicated to a target BS using a first technique;

FIG. 4b is a flow diagram of MS operations in a handover, wherein the total amount of bandwidth needed by a MS is indicated to a target BS using a first technique;

FIG. 4c is a flow diagram of serving BS operations in a handover, wherein the total amount of bandwidth needed by a MS is indicated to a target BS using a first technique;

FIG. 4d is a flow diagram of target BS operations in a handover, wherein the total amount of bandwidth needed by a MS is indicated to the target BS using a first technique;

FIG. 5a is a drawing of a message exchange in a handover, wherein the total amount of bandwidth needed by a MS is indicated to a target BS using a first technique;

FIG. 5b is a flow diagram of MS operations in a handover, wherein the total amount of bandwidth needed by a MS is indicated to a target BS using a first technique;

FIG. 5c is a flow diagram of serving BS operations in a handover, wherein the total amount of bandwidth needed by a MS is indicated to a target BS using a first technique;

FIG. 5d is a flow diagram of target BS operations in a handover, wherein the total amount of bandwidth needed by a MS is indicated to the target BS using a first technique;

FIG. 6a is a drawing of a message exchange in a handover, wherein the total amount of bandwidth needed by a MS is indicated to a target BS using a first technique;

FIG. 6b is a flow diagram of MS operations in a handover, wherein the total amount of bandwidth needed by a MS is indicated to a target BS using a first technique;

FIG. 6c is a flow diagram of serving BS operations in a handover, wherein the total amount of bandwidth needed by a MS is indicated to a target BS using a first technique;

FIG. 6d is a flow diagram of target BS operations in a handover, wherein the total amount of bandwidth needed by a MS is indicated to the target BS using a first technique.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a WiMAX compliant wireless communications system. The invention may also be applied, however, to other communications systems that are adherent to technical standards that permit handovers, such as Third Generation Partnership Project (3GPP) Long Term Evolution (LTE) and so on.

Figure 1:
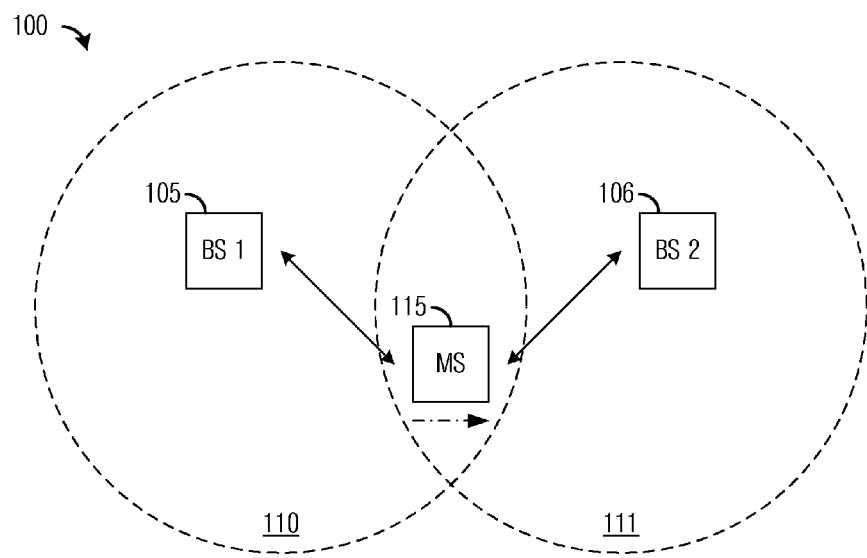
FIG. 1 is a drawing of a communications system.

FIG. 1 illustrates a communications system 100. Communications system 100 includes a first BS (BS 1) 105 and a second BS (BS 2) 106. First BS 105 has a first coverage area 110 and second BS 106 has a second coverage area 111. Also in communications system 100 is a MS 115. As shown in FIG. 1, MS 115 is served by first BS 105. However, due to the mobility of MS 115, MS 115 is approaching an outer range of first coverage area 110 and entering second coverage area 111.

As MS 115 approaches the outer range of first coverage area 110 and enter second coverage area 111, a signal quality of transmissions to and from first BS 105 may begin to drop, while the signal quality of transmissions from second BS 106 may begin to rise. As a result, MS 115 may become a candidate for a handover, wherein control of MS 115 may change from first BS 105 to second BS 106. The handover from first BS 105 to second BS 106 may involve an establishment of a connection between MS 115 and second BS 106 and a breaking of a connection between MS 115 and first BS 105.

Since first BS 105 is serving MS 115 prior to the handover, first BS 105 may be referred to as a serving BS, while second BS 106 may be a target of the handover, second BS 106 may be referred to as a target BS. Once the handover is complete, second BS 106 becomes the serving BS and first BS 105 (formerly the serving BS) no longer serves MS 115.

Figure 2A:
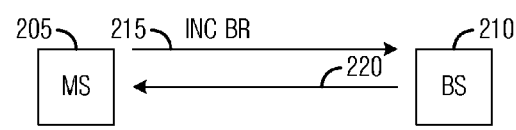
FIG. 2a is a drawing of a transmission of a bandwidth request (BR) to a serving BS, wherein the BR is an incremental BR.

FIG. 2a illustrates a transmission of a bandwidth request (BR) to a serving BS, wherein the BR is an incremental BR. As shown in FIG. 2a, when a MS 205 requires additional bandwidth, MS 205 may transmit a message to a BS 210, wherein the message includes an incremental BR (INC BR). An INC BR specifies an amount of increase bandwidth in an existing bandwidth allocation to MS 205, instead of specifying a total amount of bandwidth to be allocated to MS 205. As an example, if MS 205 is already allocated 128 kbps, an INC BR of 10 kbps would result in a total bandwidth of 138 kbps being allocated to MS 205.

An advantage of requesting increases in bandwidth using INC BR may be that since only an increase in bandwidth is signaled, signaling the BR may be smaller since fewer bits may be used to signal the increase in bandwidth rather than to signal the total amount of bandwidth.

Figure 2B:
FIG. 2b is a drawing of a transmission of a BR to a serving BS, wherein the BR is an aggregate BR.

FIG. 2b illustrates a transmission of a BR to a serving BS, wherein the BR is an aggregate BR. As shown in FIG. 2b, when a MS 255 requires additional bandwidth, MS 255 may transmit a message to BS 260, wherein the message includes an aggregate BR (AGG BR). An AGG BR specifies the total amount of bandwidth to be allocated to MS 255. As an example, if MS 255 is already allocated 128 kbps and wishes 10 additional kbps, MS 255 may signal an AGG BR of 138 kbps to BS 260.

An advantage of requesting increases in bandwidth using AGG BR may be that the serving BS (e.g., BS 260) may not need to keep track of a total bandwidth allocated to a MS (e.g., MS 255) nor does the serving BS need to compute the total bandwidth to allocate to the MS, which may involve multiple computations if the total bandwidth allocated to the MS is not maintained.

Figure 3:
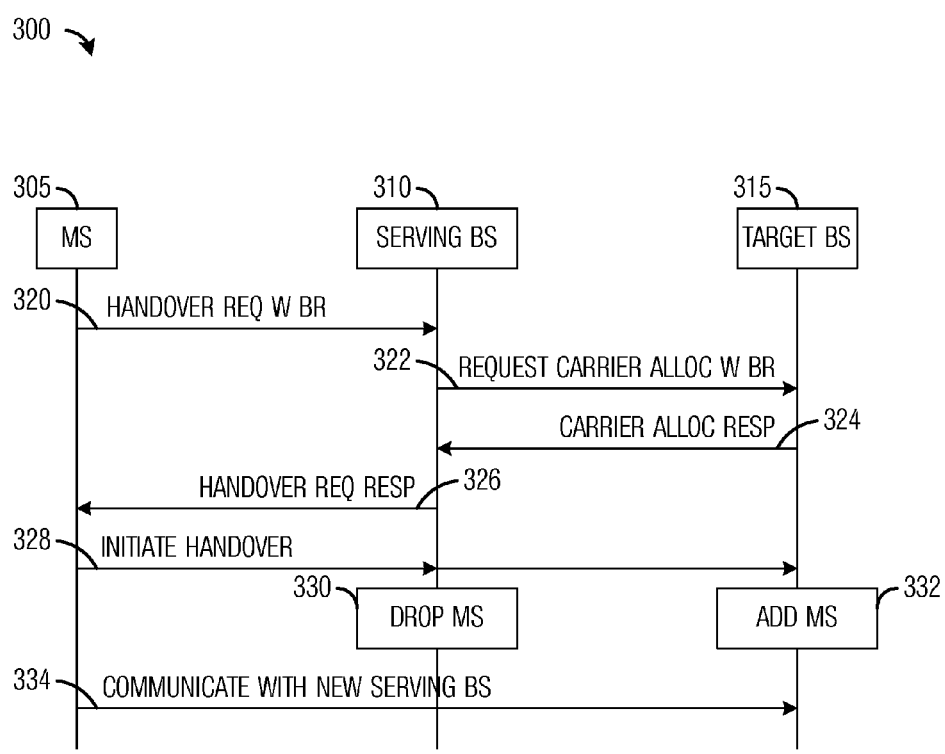
FIG. 3 is a drawing of a message exchange in a handover.

FIG. 3 illustrates a message exchange 300 in a handover. As discussed previously, a handover involves a MS, a serving BS, and at least one target BS. Message exchange 300 includes messages exchanged between a MS 305, a serving BS 310, and a target BS 315, wherein target BS 315 is one of many target BS and is an actual target BS that performs the handover.

Message exchange 300 may begin with MS 305 sending a handover request message to serving BS 310 (event 320). The handover request message may be in response to a message sent to MS 305 by serving BS 310 when serving BS 310 notices that a signal quality of transmissions from MS 305 may be dropping. Alternatively, the handover request message may be in response to a signal measurement message sent to MS 305 by serving BS 310. The handover request message may include a BR, either in the form of an INC BR or an AGG BR.

Serving BS 310 may send a request carrier allocation message to target BS 315 (event 322). Request carrier allocation message may include the BR sent to serving BS 310 by MS 305. According to the WiMAX technical standards, serving BS 310 may forward the BR to target BS 315 unchanged. Target BS 315 may allocate carriers to MS 305 based on the BR and return a carrier allocation response message to serving BS 310 (event 324). The carrier allocation response message may include an indication that target BS 315 has allocated carrier(s) for MS 305 and is ready to serve MS 305.

Serving BS 310, upon receipt of the carrier allocation response message from target BS 315, may send a handover request message to MS 305 (event 326). The handover request message may include an indication that a target BS (e.g., target BS 315) has accepted the handover request from MS 305 and has allocated carrier(s) to support the BR sent by MS 315. MS 305 may then initiate a handover with serving BS 310 and target BS 315 (event 328). The handover may include a termination of a connection with serving BS 310 (block 330) and an establishment of a connection with target BS 315 (block 332). With the handover complete, MS 305 and target BS 315, now a serving BS for MS 305, may begin communications while being served by target BS 315.

Although message exchange 300 illustrates a successful completion of a handover, if the BR sent by MS 305 was an INC BR, it is very likely that target BS 315 allocated less bandwidth to MS 305 than actually needed. With less bandwidth than actually needed, the performance of connections of MS 305 may be severely impacted and some connections may even be dropped. Furthermore, with an inaccurate total amount of bandwidth needed by MS 305, target BS 315 may have erroneously agreed to serve MS 305.

FIG. 4a illustrates a message exchange 400 in a handover, wherein the total amount of bandwidth needed by a MS is indicated to a target BS using a first technique. Message exchange 400 includes messages exchanged between a MS 405, a serving BS 407, and a target BS 409, wherein target BS 409 is one of many target BS and is an actual target BS that performs the handover.

Message exchange 400 may begin with MS 405 sending a handover request message to serving BS 407 (event 411). The handover request message may be in response to a message sent to MS 405 by serving BS 407 when serving BS 407 notices that a signal quality of transmissions from MS 405 may be dropping. Alternatively, the handover request message may be in response to a signal measurement message sent to MS 405 by serving BS 407. The handover request message may include a BR, in the form of an INC BR.

Serving BS 407 may then compute a total amount of bandwidth required by MS 405 (block 413). According to an embodiment, if serving BS 407 already has a total amount of bandwidth allocated to MS 405, serving BS 407 may simply add the bandwidth in the INC BR to the total amount of bandwidth to determine the total amount of bandwidth required by MS 405. Alternatively, serving BS 407 may combine its last value for the total amount of bandwidth allocated to MS 405 and any intermediate INC BR (including the INC BR contained in the handover request message just received from MS 405) to determine the total amount of bandwidth required by MS 405.

Serving BS 407 may send a request carrier allocation message to target BS 409 (event 415). Request carrier allocation message may include an indication of the total amount of bandwidth required by MS 405. Target BS 409 may allocate carriers to MS 405 based on the total amount of bandwidth required by MS 405 and return a carrier allocation response message to serving BS 407 (event 417). The carrier allocation response message may include an indication that target BS 409 has allocated carrier(s) for MS 405 and is ready to serve MS 405. A remainder of the handover may proceed as described previously in FIG. 3.

FIG. 4b illustrates a flow diagram of MS operations 420 in a handover, wherein the total amount of bandwidth needed by a MS is indicated to a target BS using a first technique. MS operations 420 may be indicative of operations occurring in a MS, such as MS 405, as the MS participates in a handover from a serving BS to a target BS. MS operations 420 may occur while the MS is in a normal operating mode.

MS operations 420 may begin with the MS initiating a handover with a handover request message sent to its serving BS (block 425). The handover request message may include a BR in the form of an INC BR. The MS may subsequently receive a handover request response message from the serving BS, wherein the handover request response message may include an indication that the target BS has allocated sufficient resources for the MS (block 427). The MS may then commence the handover with the serving BS and the target BS (block 429). According to an embodiment, the handover may include the MS terminating its connection(s) with the serving BS and establishing a connection(s) with the target BS, and so on. After the handover completes, the MS may communicate with its new serving BS, formerly the target BS (block 431). MS operations 420 may then terminate.

FIG. 4c illustrates a flow diagram of serving BS operations 435 in a handover, wherein the total amount of bandwidth needed by a MS is indicated to a target BS using a first technique. Serving BS operations 435 may be indicative of operations in a serving BS, such as serving BS 407, as the serving BS participates in a handover with a MS and a target BS. Serving BS operations 435 may occur while the serving BS is in a normal operating mode.

Serving BS operations 435 may begin with the serving BS receiving a handover request message from the MS (block 440). According to an embodiment, the handover request message may include a BR in the form of an INC BR. The serving BS may then compute a total amount of bandwidth that the MS requires, i.e., an AGG BR (block 442). According to an embodiment, the total amount of bandwidth that the MS requires may be a combination of INC BRs received from the MS (i.e., previous INC BRs) and a previous AGG BR. The serving BS may then send a carrier allocation request message to the target BS, wherein the carrier allocation request message includes the total amount of bandwidth that the MS requires, i.e., the AGG BR (block 444).

The serving BS may subsequently receive a carrier allocation request response message from the target BS with an indication that the target BS has allocated resources sufficient to support the MS, i.e., the target BS has allocated resources to support the AGG BR (block 446). The serving BS may then send a handover request response message to the MS, wherein the handover request response message includes an indication that the target BS has allocated sufficient resources for the MS (block 448). The serving BS may then participate in the handover, which may include terminating connections with the MS and freeing resources previously allocated to the MS (block 450). Serving BS operations 435 may then terminate.

FIG. 4d illustrates a flow diagram of target BS operations 455 in a handover, wherein the total amount of bandwidth needed by a MS is indicated to the target BS using a first technique. Target BS operations 455 may be indicative of operations occurring in a target BS, such as target BS 409, as the target BS participates in a handover with a MS and a serving BS. Target BS operations 455 may occur while the target BS is in a normal operating mode.

Target BS operations 455 may begin with the target BS receiving a carrier allocation request message from the serving BS (block 460). According to an embodiment, the carrier allocation request message includes an AGG BR so that the target BS knows exactly how much bandwidth the MS requires. The target BS may then allocate carriers to provide sufficient bandwidth to meet the requirements of the MS (block 462). The target BS may then send a carrier allocation request response message to the serving BS of the MS (block 464). The carrier allocation request response message may include an indication that the target BS has allocated sufficient carriers to meet the bandwidth requirements of the MS.

The target BS may then participate in the handover (block 466). Participation in the handover may include the target BS establishing a connection(s) with the MS, and so on. With the connection(s) established, the target BS becomes the serving BS of the MS and communications between the MS and the serving BS (former target BS) may commence (block 468). Target BS operations 455 may then terminate.

FIG. 5a illustrates a message exchange 500 in a handover, wherein the total amount of bandwidth needed by a MS is indicated to a target BS using a second technique. Message exchange 500 includes messages exchanged between a MS 505, a serving BS 507, and a target BS 509, wherein target BS 509 is one of many target BS and is an actual target BS that performs the handover.

Message exchange 500 may begin with MS 505 sending a message to target BS 509, wherein the message includes a total amount of bandwidth currently being used by MS 505 (event 511). According to an embodiment, MS 505 may periodically send updates of the total amount of bandwidth that it is currently using. According to an alternative embodiment, MS 505 may send an update to target BS 509 whenever it detects a new target BS. According to yet another alternative embodiment, MS 505 may send an update when MS 505 determines that its bandwidth requirements have changed by more than a specified amount, when MS 505 has requested a specified number of changes (e.g., increases) in its bandwidth allocation from serving BS 507, and so forth.

Message exchange 500 may then continue with MS 505 sending a handover request message to serving BS 507 (event 513). The handover request message may be in response to a message sent to MS 505 by serving BS 507 when serving BS 507 notices that a signal quality of transmissions from MS 505 may be dropping. Alternatively, the handover request message may be in response to a signal measurement message sent to MS 505 by serving BS 507. The handover request message may include a BR, in the form of an INC BR.

Serving BS 507 may send a request carrier allocation message to target BS 509 (event 515). Request carrier allocation message may include an indication of the INC BR from MS 505. Target BS 509 may then compute a total amount of bandwidth required by MS 505 by combining the INC BR with the AGG BR provided by MS 505 (e.g., in event 511) (block 517). Target BS may also allocate carriers to MS 505 based on the total amount of bandwidth required by MS 505 and return a carrier allocation response message to serving BS 507 (event 519). The carrier allocation response message may include an indication that target BS 509 has allocated carrier(s) for MS 505 and is ready to serve MS 505. A remainder of the handover may proceed as described previously in FIG. 3.

FIG. 5b illustrates a flow diagram of MS operations 520 in a handover, wherein the total amount of bandwidth needed by a MS is indicated to a target BS using a second technique. MS operations 520 may be indicative of operations occurring in a MS, such as MS 505, as the MS participates in a handover from a serving BS to a target BS. MS operations 520 may occur while the MS is in a normal operating mode.

MS operations 520 may begin with the MS sending a total bandwidth requirement to the target BS (block 525). The MS may then initiate a handover with a handover request message sent to its serving BS (block 527). The handover request message may include a BR in the form of an INC BR. The MS may subsequently receive a handover request response message from the serving BS, wherein the handover request response message may include an indication that the target BS has allocated sufficient resources for the MS (block 529). The MS may then commence the handover with the serving BS and the target BS (block 531). According to an embodiment, the handover may include the MS terminating its connection(s) with the serving BS and establishing a connection(s) with the target BS, and so on. After the handover completes, the MS may communicate with its new serving BS, formerly the target BS (block 533). MS operations 520 may then terminate.

FIG. 5c illustrates a flow diagram of serving BS operations 535 in a handover, wherein the total amount of bandwidth needed by a MS is indicated to a target BS using a second technique. Serving BS operations 535 may be indicative of operations in a serving BS, such as serving BS 507, as the serving BS participates in a handover with a MS and a target BS. Serving BS operations 535 may occur while the serving BS is in a normal operating mode.

Serving BS operations 535 may begin with the serving BS receiving a handover request message from the MS (block 540). According to an embodiment, the handover request message may include a BR in the form of an INC BR. The serving BS may then send a carrier allocation request message to the target BS, wherein the carrier allocation request message includes the INC BR (block 542).

The serving BS may subsequently receive a carrier allocation request response message from the target BS with an indication that the target BS has allocated resources sufficient to support the MS, i.e., the target BS has allocated resources to support the AGG BR (block 544). The serving BS may then send a handover request response message to the MS, wherein the handover request response message includes an indication that the target BS has allocated sufficient resources for the MS (block 546). The serving BS may then participate in the handover, which may include terminating connections with the MS and freeing resources previously allocated to the MS (block 548). Serving BS operations 535 may then terminate.

FIG. 5d illustrates a flow diagram of target BS operations 555 in a handover, wherein the total amount of bandwidth needed by a MS is indicated to the target BS using a second technique. Target BS operations 555 may be indicative of operations occurring in a target BS, such as target BS 509, as the target BS participates in a handover with a MS and a serving BS. Target BS operations 555 may occur while the target BS is in a normal operating mode.

Target BS operations 555 may begin with the target BS receiving a message that includes an indication of a total amount of bandwidth required by the MS (block 560). The target BS may also receive carrier allocation request message from the serving BS (block 562). The carrier allocation request message may include an indication of an INC BR from the MS. The target BS may then compute an updated total bandwidth required by the MS based on the INC BR from the carrier allocation request message and the total amount of bandwidth required by the MS (e.g., from block 560). The target BS may then allocate carriers to provide sufficient bandwidth to meet the requirements of the MS (block 566). The target BS may then send a carrier allocation request response message to the serving BS of the MS (block 568). The carrier allocation request response message may include an indication that the target BS has allocated sufficient carriers to meet the bandwidth requirements of the MS.

The target BS may then participate in the handover (block 570). Participation in the handover may include the target BS establishing a connection(s) with the MS, and so on. With the connection(s) established, the target BS becomes the serving BS of the MS and communications between the MS and the serving BS (former target BS) may commence (block 572). Target BS operations 555 may then terminate.

FIG. 6a illustrates a message exchange 600 in a handover, wherein the total amount of bandwidth needed by a MS is indicated to a target BS using a third technique. Message exchange 600 includes messages exchanged between a MS 605, a serving BS 607, and a target BS 609, wherein target BS 609 is one of many target BS and is an actual target BS that performs the handover.

Message exchange 600 may begin with MS 605 sending a handover request message to serving BS 607 (event 611). Embedded in the handover request message may be a total bandwidth required by the MS, e.g., an AGG BR. The handover request message may be in response to a message sent to MS 605 by serving BS 607 when serving BS 607 notices that a signal quality of transmissions from MS 605 may be dropping. Alternatively, the handover request message may be in response to a signal measurement message sent to MS 605 by serving BS 607. The handover request message may include a BR, in the form of an INC BR.

Serving BS 607 may send a carrier allocation request message to target BS 509 (event 613). The carrier allocation request message may include the AGG BR from MS 505 embedded in it. Target BS 609 parse the carrier allocation request message to determine the AGG BR. Target BS may also allocate carriers to MS 605 based on the total amount of bandwidth required by MS 605 and return a carrier allocation response message to serving BS 607 (event 615). The carrier allocation response message may include an indication that target BS 609 has allocated carrier(s) for MS 605 and is ready to serve MS 605. A remainder of the handover may proceed as described previously in FIG. 3.

FIG. 6b illustrates a flow diagram of MS operations 620 in a handover, wherein the total amount of bandwidth needed by a MS is indicated to a target BS using a third technique. MS operations 620 may be indicative of operations occurring in a MS, such as MS 605, as the MS participates in a handover from a serving BS to a target BS. MS operations 620 may occur while the MS is in a normal operating mode.

MS operations 620 may begin with the MS initiating a handover with a handover request message sent to its serving BS (block 625). The handover request message may include a total amount of bandwidth required by the MS embedded in the handover request message. The MS may subsequently receive a handover request response message from the serving BS, wherein the handover request response message may include an indication that the target BS has allocated sufficient resources for the MS (block 627). The MS may then commence the handover with the serving BS and the target BS (block 629). According to an embodiment, the handover may include the MS terminating its connection(s) with the serving BS and establishing a connection(s) with the target BS, and so on. After the handover completes, the MS may communicate with its new serving BS, formerly the target BS (block 631). MS operations 620 may then terminate.

FIG. 6c illustrates a flow diagram of serving BS operations 635 in a handover, wherein the total amount of bandwidth needed by a MS is indicated to a target BS using a third technique. Serving BS operations 635 may be indicative of operations in a serving BS, such as serving BS 607, as the serving BS participates in a handover with a MS and a target BS. Serving BS operations 635 may occur while the serving BS is in a normal operating mode.

Serving BS operations 635 may begin with the serving BS receiving a handover request message from the MS (block 640). According to an embodiment, the handover request message may include a total amount of bandwidth required by the MS embedded in the handover request message. The serving BS may then send a carrier allocation request message to the target BS (block 642). The carrier allocation request message may also have the total amount of bandwidth required by the MS embedded in the message.

The serving BS may subsequently receive a carrier allocation request response message from the target BS with an indication that the target BS has allocated resources sufficient to support the MS, i.e., the target BS has allocated resources to support the total amount of bandwidth required by the MS (block 644). The serving BS may then send a handover request response message to the MS, wherein the handover request response message includes an indication that the target BS has allocated sufficient resources for the MS (block 646). The serving BS may then participate in the handover, which may include terminating connections with the MS and freeing resources previously allocated to the MS (block 648). Serving BS operations 635 may then terminate.

FIG. 6d illustrates a flow diagram of target BS operations 655 in a handover, wherein the total amount of bandwidth needed by a MS is indicated to the target BS using a third technique. Target BS operations 655 may be indicative of operations occurring in a target BS, such as target BS 609, as the target BS participates in a handover with a MS and a serving BS. Target BS operations 655 may occur while the target BS is in a normal operating mode.

Target BS operations 655 may begin with the target BS receiving a carrier allocation request message from the serving BS (block 660). The carrier allocation request message may include a total amount of bandwidth required by the MS embedded in the message. The target BS may then allocate carriers to provide sufficient bandwidth to meet the requirements of the MS (block 662). The target BS may then send a carrier allocation request response message to the serving BS of the MS (block 664). The carrier allocation request response message may include an indication that the target BS has allocated sufficient carriers to meet the bandwidth requirements of the MS.

The target BS may then participate in the handover (block 666). Participation in the handover may include the target BS establishing a connection(s) with the MS, and so on. With the connection(s) established, the target BS becomes the serving BS of the MS and communications between the MS and the serving BS (former target BS) may commence (block 668). Target BS operations 655 may then terminate.

Figure 7:
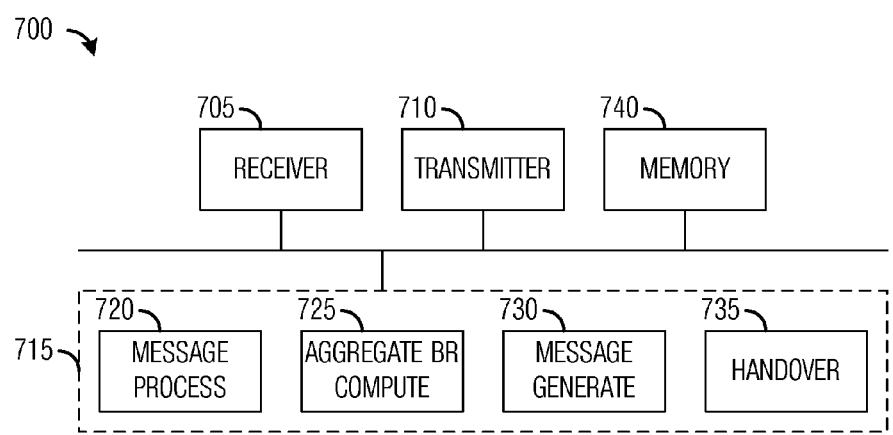
FIG. 7 is a diagram of a communications device.

FIG. 7 provides an alternate illustration of a communications device 700. Communications device 700 may be used to implement various ones of the embodiments discussed herein. As shown in FIG. 7, a receiver 705 is configured to receive information and a transmitter 710 is configured to transmit information. A message process unit 720 is configured to process messages received from other communications devices. An aggregate bandwidth required compute unit 725 is configured to compute a total amount of bandwidth required based on incremental bandwidth requests and a previously computed total amount of bandwidth. A message generate unit 730 is configured to package information into messages for transmission purposes. A handover unit 735 is configured to control operations involved in a handover. A memory 740 may be used to store aggregate bandwidth requests, incremental bandwidth requests, the total amount of bandwidth required, and so forth.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, receiver 705 and transmitter 710 may be implemented as specific hardware blocks, while message process unit 720, aggregate bandwidth required unit 725, message generate unit 730, and handover unit 735 may be software modules executing in a processor 715 or custom compiled logic arrays of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a mobile station, the method comprising:
    transmitting, by the mobile station to a serving controller, a first message, wherein the first message comprises an incremental bandwidth request;
    receiving, by the mobile station from the serving controller, a second message responsive to the first message, wherein the second message comprises an indicator indicating that a target controller, previously not having resources allocated to the mobile station, has allocated resources for the mobile station at least equal to an actual total bandwidth required by the mobile station as computed by the serving controller; and
    initiating, by the mobile station, a handover with the target controller and the serving controller without receiving an allocation of the actual total bandwidth from the serving controller.

2. The method of claim 1, wherein the first message is transmitted to the serving controller.

3. The method of claim 1, wherein the first message transmitted by the mobile station is a handover message.

4. The method of claim 1, wherein the serving controller computes an update to the total bandwidth required by the mobile station in accordance with the incremental bandwidth request, and transmits a third message to the target controller, wherein the third message comprises the update to the total bandwidth required by the mobile station.

5. The method of claim 2, wherein the first message is also transmitted to the target controller.

6. The method of claim 1, further comprising transmitting the total bandwidth required by the mobile station to the target controller.

7. The method of claim 6, wherein the serving controller transmits a fourth message to the target controller, wherein the fourth message comprises the incremental bandwidth request.

8. The method of claim 6, wherein the total bandwidth required by the mobile station is transmitted periodically, after a specified number of incremental bandwidth requests, after a specified change in the total bandwidth required by the mobile station, or a combination thereof.

9. The method of claim 1, wherein initiating a handover comprises:
    establishing a first connection with the target controller; and
    terminating a second connection with the serving controller.

10. A method for operating a serving controller, the method comprising:
    receiving, by the serving controller, a first message from a mobile station, the first message comprising an incremental bandwidth request;
    transmitting, by the serving controller, a second message to a target controller, the second message comprising a bandwidth request indicating an actual total bandwidth requirement for the mobile station computed by the serving controller, wherein the total bandwidth is to be provided directly to the mobile station by the target station;
    transmitting, by the serving controller, a third message to the mobile station, the third message comprising a response to the first message; and
    participating, by the serving controller, in a handover with the target controller and the mobile station without the serving controller providing an allocation of the actual total bandwidth to the mobile station.

11. The method of claim 10, wherein the total bandwidth requirement of the mobile station comprises a combination of the incremental bandwidth request and a previous total bandwidth request.

12. The method of claim 10, wherein the total bandwidth requirement comprises a combination of the incremental bandwidth request and one or more previous incremental bandwidth requests.

13. The method of claim 10, wherein the total bandwidth requirement for the mobile station is updated each time a new incremental bandwidth request is received.

14. The method of claim 10, wherein the first message received from the mobile station is a handover message.

15. The method of claim 10, wherein participating in a handover comprises:
    terminating a connection with the mobile station; and
    freeing resources dedicated to the mobile station.

16. A method for operating a target controller, the method comprising:
    receiving, by the target controller, a first message directly from a mobile station, wherein the first message comprises an initial actual total bandwidth requirement for the mobile station;
    receiving, by the target controller, a second message directly from a serving controller, wherein the second message comprises an actual incremental bandwidth requirement;
    determining, by the target controller, a sum of the actual incremental bandwidth requirement and the initial actual total bandwidth requirement for the mobile station;
    allocating, by the target controller, carriers in accordance with the sum of the actual incremental bandwidth requirement and the initial actual total bandwidth requirement for the mobile station;
    transmitting, by the target controller, a third message, wherein the third message comprises an indication of the allocated carriers; and
    participating, by the target controller, in a handover for the mobile station, after the allocating the carriers.

17. The method of claim 16, wherein the target controller receives multiple first messages periodically, when a change in the initial actual total bandwidth requirement exceeds a specified amount, when a specified number of bandwidth requests have been transmitted, or a combination thereof.

18. The method of claim 16, wherein participating in a handover comprises establishing a connection with the mobile station.

19. A communications device comprising:
a transmitter configured to transmit a first message to a serving controller, wherein the first message comprises an incremental bandwidth request;
a receiver coupled to the transmitter, the receiver configured to receive, from the serving controller, a second message responsive to the first message, wherein the second message comprises an indicator indicating that a target controller has allocated resources at least equal to an actual total bandwidth required by the communications device as computed by the serving controller; and
a processor coupled to the transmitter and to the receiver, the processor configured to initiate a handover with the target controller and the serving controller without receiving an allocation of the actual total bandwidth from the serving controller.

20. The communications device of claim 19, wherein the transmitter is further configured to transmit a total bandwidth requirement for the communications device to the target controller.

21. The communications device of claim 20, wherein the transmitter is further configured to transmit a third message to the target controller, wherein the third message comprises the incremental bandwidth request.

22. The communications device of claim 20, wherein the transmitter is configured to transmit the total bandwidth required by the communications device periodically, after a specified number of incremental bandwidth requests have been transmitted, a change in the total bandwidth required by the communications device exceeds a specified amount, or a combination thereof.

* * * * *